(12) United States Patent
Karayaka et al.

(10) Patent No.: US 7,097,387 B2
(45) Date of Patent: Aug. 29, 2006

(54) ENGINEERED MATERIAL BUOYANCY SYSTEM AND DEVICE

(75) Inventors: Metin Karayaka, Houston, TX (US); Paul N. Stanton, Houston, TX (US)

(73) Assignee: Technip France, Courbevoir (FR)

( * ) Notice: Subject to any disclaimer, the term of this patent is extended or adjusted under 35 U.S.C. 154(b) by 0 days.

(21) Appl. No.: 11/029,839

(22) Filed: Jan. 5, 2005

(65) Prior Publication Data

US 2005/0117974 A1 Jun. 2, 2005

Related U.S. Application Data (63) Continuation of application No. 10/360,426, filed on Feb. 7, 2003, now Pat. No. 6,848,863, which is a continuation of application No. 09/643,185, filed on Aug. 21, 2000, now abandoned.

(51) Int. Cl.
*E21B 33/037* (2006.01)
*E21B 17/31* (2006.01)
*E02D 5/60* (2006.01)

(52) U.S. Cl. .................. 405/211; 405/171; 405/195.1; 405/224.2; 166/350; 166/357; 114/243

(58) Field of Classification Search .. 405/224.1–224.4, 405/195.1, 211, 216, 203, 205, 171, 162, 405/158; 166/350, 367; 175/5–8; 441/9, 441/30, 40; 114/243, 264
See application file for complete search history.

(56) References Cited

U.S. PATENT DOCUMENTS

| | | | |
|---|---|---|---|
| 1,266,050 A | 5/1918 | Reynolds | 405/211 |
| 2,475,888 A * | 7/1949 | Hackett | 405/224 |
| 2,669,960 A | 2/1954 | Laycoek | 114/0.5 |
| 2,963,868 A | 12/1960 | Armstrong | 61/46.5 |
| 3,207,110 A | 9/1965 | Laborde et al. | 114/0.5 |
| 3,517,110 A | 6/1970 | Morgan et al. | |
| 3,548,884 A | 12/1970 | Ambrose | |
| 3,613,736 A | 10/1971 | Kuwabara | |
| 3,729,756 A | 5/1973 | Cook et al. | |
| 3,766,307 A | 10/1973 | Andrews, Jr. | |
| 3,811,477 A | 5/1974 | Thawley | |
| 3,839,902 A | 10/1974 | Scott et al. | |
| 3,855,656 A | 12/1974 | Blenkarn | |
| 3,933,108 A | 1/1976 | Bugh | |

(Continued)

FOREIGN PATENT DOCUMENTS

GB 2336810 A 11/1999

(Continued)

OTHER PUBLICATIONS

Every, M.J. et al.; "Vortex-Excited Vibrations of Ctlinders . . . " Ocean Engng. vol. 9, No. 2, pp. 135-157, 1982.

(Continued)

*Primary Examiner*—Jong-Suk (James) Lee
(74) *Attorney, Agent, or Firm*—Klein, O'Neill & Singh, LLP; Howard Klein (57) ABSTRACT

There is provided a buoyancy system for a structure having at least one component being substantially stationary with respect to the bottom of a water covered area. The system comprises a set of buoyancy modules of engineered materials to apply an identified amount of buoyancy. The set of buoyancy modules is attached to the structure at a set of buoyancy load transfer locations. The set of buoyancy modules comprises layers of the engineered materials. The engineered materials comprise a substantially reinforced axial layer, a substantially reinforced hoop layer; and a leak prevention layer.

8 Claims, 12 Drawing Sheets

U.S. PATENT DOCUMENTS

| | | | |
|---|---|---|---|
| 3,957,112 A | 5/1976 | Knibbe et al. | |
| 3,972,223 A | 8/1976 | Torghele | |
| 3,996,654 A | 12/1976 | Johnson | |
| 4,021,589 A | 5/1977 | Copley | |
| 4,040,165 A | 8/1977 | Miessler et al. | |
| 4,063,322 A | 12/1977 | Tolan | |
| 4,102,142 A | 7/1978 | Lee | |
| 4,148,342 A | 4/1979 | Welsby | |
| 4,153,079 A | 5/1979 | Ambrose | |
| 4,154,266 A | 5/1979 | Tanaka et al. | |
| 4,234,047 A | 11/1980 | Mott | |
| 4,259,553 A | 3/1981 | Tanaka et al. | |
| 4,422,801 A | 12/1983 | Hale et al. | |
| 4,448,266 A | 5/1984 | Potts | 175/7 |
| 4,474,129 A | 10/1984 | Watkins et al. | |
| 4,477,207 A | 10/1984 | Johnson | |
| 4,482,590 A | 11/1984 | Boulet et al. | |
| 4,634,314 A | 1/1987 | Pierce | |
| 4,644,977 A | 2/1987 | Arterburn | |
| 4,702,321 A | 10/1987 | Horton | |
| 4,740,109 A | 4/1988 | Horton | 405/224 |
| 4,821,804 A | 4/1989 | Pierce | |
| 4,823,719 A | 4/1989 | Sarwe | 114/126 |
| 4,869,192 A | 9/1989 | Pawolski | 114/265 |
| 5,046,896 A | 9/1991 | Cole | |
| 5,330,294 A | 7/1994 | Guesnon | |
| 5,558,467 A | 9/1996 | Horton | |
| 5,651,081 A | 7/1997 | Blew et al. | |
| 5,683,206 A | 11/1997 | Copple | 405/224.2 |
| 5,823,131 A | 10/1998 | Boatman et al. | 114/230 |
| 5,894,808 A | 4/1999 | Miyoshi | 114/222 |
| 6,004,074 A | 12/1999 | Shanks, II | |
| 6,019,055 A | 2/2000 | Likitcheva | 114/61.1 |
| 6,161,620 A | 12/2000 | Cox et al. | 166/367 |
| 6,257,337 B1 | 7/2001 | Wells | |
| 6,263,824 B1 | 7/2001 | Balint et al. | 114/264 |
| 6,296,066 B1 | 10/2001 | Terry et al. | |
| 6,375,391 B1 | 4/2002 | Borseth et al. | 405/224.4 |
| 6,439,810 B1 * | 8/2002 | Nish et al. | 405/224.2 |
| 6,524,152 B1 | 2/2003 | Dauphin et al. | 441/133 |
| 6,575,665 B1 * | 6/2003 | Richter et al. | 405/195.1 |
| 6,848,863 B1 * | 2/2005 | Karayaka et al. | 405/211 |

FOREIGN PATENT DOCUMENTS

| | | | |
|---|---|---|---|
| GB | 2069450 A | | 8/2001 |
| GB | 2398762 | * | 9/2004 |
| JP | 1-273783 | | 11/1989 |
| WO | WO 98/53176 | | 11/1998 |
| WO | WO 99/05389 | | 2/1999 |

OTHER PUBLICATIONS

Jacobsen, Vagner et al.; "Vibration SUppression Devices for Long, SLender Tubulars" Offshore Technology Conference held May 6-9; 1996.

Finn, Lyle; "Reliable Riser Systems for Spars" 17th Annual Intre. Conf. on Offshore Mechanics and Arctdic Eng. 1998.

* cited by examiner

ENGINEERED MATERIAL BUOYANCY SYSTEM AND DEVICE

CROSS-REFERENCES TO RELATED APPLICATIONS

This application is a continuation of application Ser. No. 10/360,426 filed Feb. 7, 2003, now U.S. Pat. No. 6,848,863, which is a continuation of application Ser. No. 09/643,185 filed Aug. 21, 2000, now abandoned.

STATEMENT REGARDING FEDERALLY SPONSORED RESEARCH OR DEVELOPMENT

Not applicable.

BACKGROUND OF THE INVENTION

The present invention relates to the application of buoyancy to objects used in large vessel and platform operations.

Vast oil reservoirs have recently been discovered in very deep waters around the world, principally in the Gulf of Mexico, Brazil and West Africa. Water depths for these discoveries range from 1500 ft. to nearly 10,000 ft. Conventional offshore oil production methods using a fixed truss type platform are not suitable for these water depths. These platforms become dynamically active (flexible) in these water depths. Stiffening them to avoid excessive and damaging dynamic responses to wave forces is prohibitively expensive.

Deep water oil and gas production has thus turned to new technologies based on floating production systems. These systems come in several forms, but all of them rely on buoyancy for support and some form of a mooring system for lateral restraint against the environmental forces of wind, waves and current.

These floating production systems (FPS) sometimes are used for drilling as well as production. They are also sometimes used for storing oil for offloading to a tanker. This is most common in Brazil and West Africa, but not in Gulf of Mexico as of yet. In the Gulf of Mexico, oil and gas are exported through pipelines to shore.

Drilling, production, and export of hydrocarbons all require some form of vertical conduit through the water column between the sea floor and the FPS. These conduits are usually in the form of pipes which are called "risers." Typical risers are either vertical (or nearly vertical) pipes held up at the surface by tensions devices; flexible pipes which are supported at the top and formed in a modified category shape to the sea bed; or steel pipe which is also supported at the top and configured in a category to the sea bed (Steel Category Risers—commonly known as SCRs).

The flexible and SCR type risers may in most cases be directly attached to the floating vessel. Their category shapes allow them to comply with the motions of the FPS due to environmental forces. These motions can be as much as 10%–20% of the water depth horizontally, and 10's of ft vertically, depending on the type of vessel, mooring and location.

Top Tensioned risers (TTRs) typically need to have higher tensions than the flexible risers, and the vertical motions of the vessel need to be isolated from the risers. TTRs have significant advantages for production over the other forms of risers, however, because they allow the wells to be drilled directly from the FPS, avoiding an expensive separate floating drilling rig. Also, wellhead control valves placed on board the FPS allow for the wells to be maintained from the FPS. Flexible and SCR type production risers require the wellhead control valves to be placed on the seabed where access and maintenance is expensive. These surface wellhead and subsurface wellhead systems are commonly referred to as "Dry tree" and "Wet Tree" types of production systems, respectively.

Drilling risers must be of the TTR type to allow for drill pipe rotation within the riser.

Export risers may be of either type.

TTR tensions systems are a technical challenge, especially in very deep water where the required top tensions can be 1000 kips or more. Some types of FPS vessels, e.g. ship shaped hulls, have extreme motions which are too large for TTRS. These types of vessels are only suitable for flexible risers. Other, low heave (vertical motion), FPS designs are suitable for TTRS. This includes Tension Leg Platform (TLP), Semi-submersibles, and Spars, all of which are in service today.

Of these, only the TLP and Spar platforms use TTR production risers. Semi-submersibles use TTRs for drilling risers, but these must be disconnected in extreme weather. Production risers need to be designed to remain connected to the seabed in extreme events, typically the 100 year return period storm. Only very stable vessels are suitable for this.

Figures 10, 11:
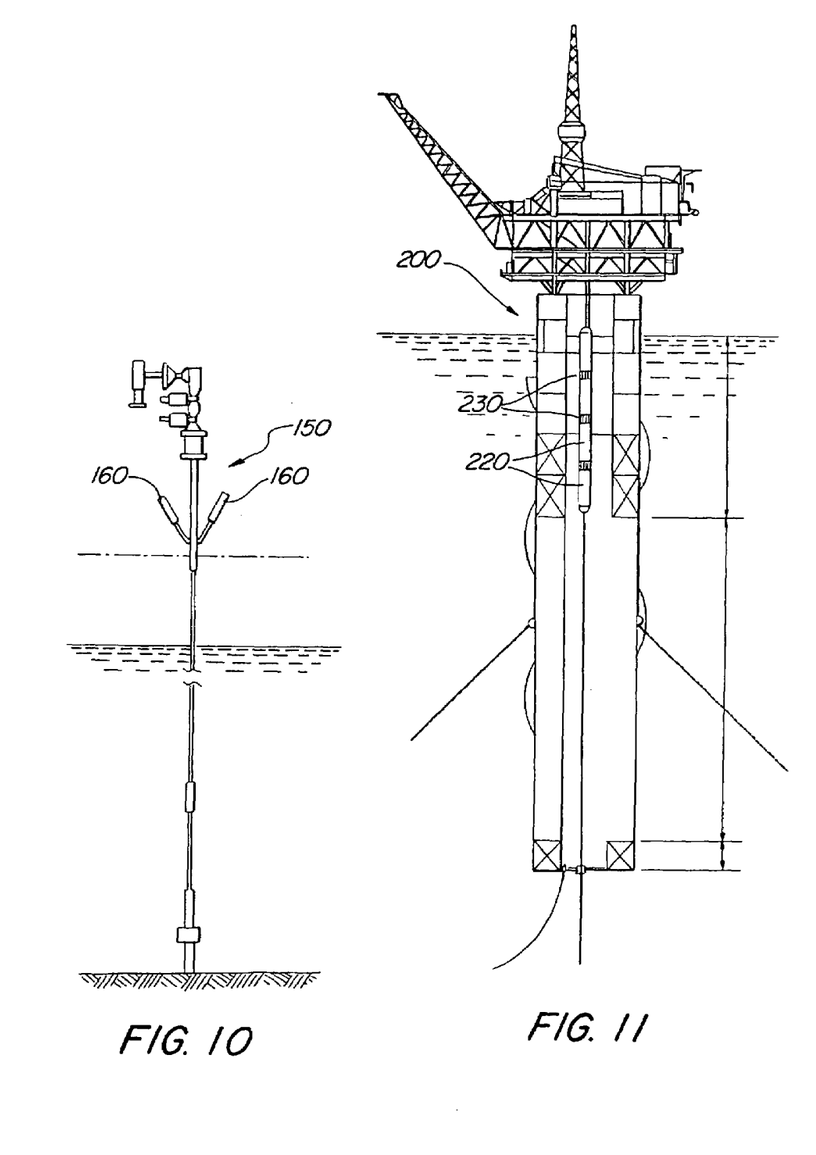
FIG. 10 illustrates a TLP riser system with tensioners.
FIG. 11 illustrates a riser arrangement in a caisson spar platform.

Early TTR designs employed on semi-submersibles and TLPs used active hydraulic Pensioners to support the risers. FIG. 10 illustrates a TLP riser system 150 with tensioners 160. As tensions and stroke requirements grow, these active tensioners become prohibitively expensive. They also require large deck area, and the loads have to be carried by the FPS structure.

Spar type platforms recently used in the Gulf of Mexico use a passive means for tensions the risers. These type platforms have a very deep draft with a central shaft, or centerwell, through which the risers pass. Buoyancy cans inside the centerwell provide the top tension for the risers. These cans are more reliable and less costly than active tensioners.

Figure 12:
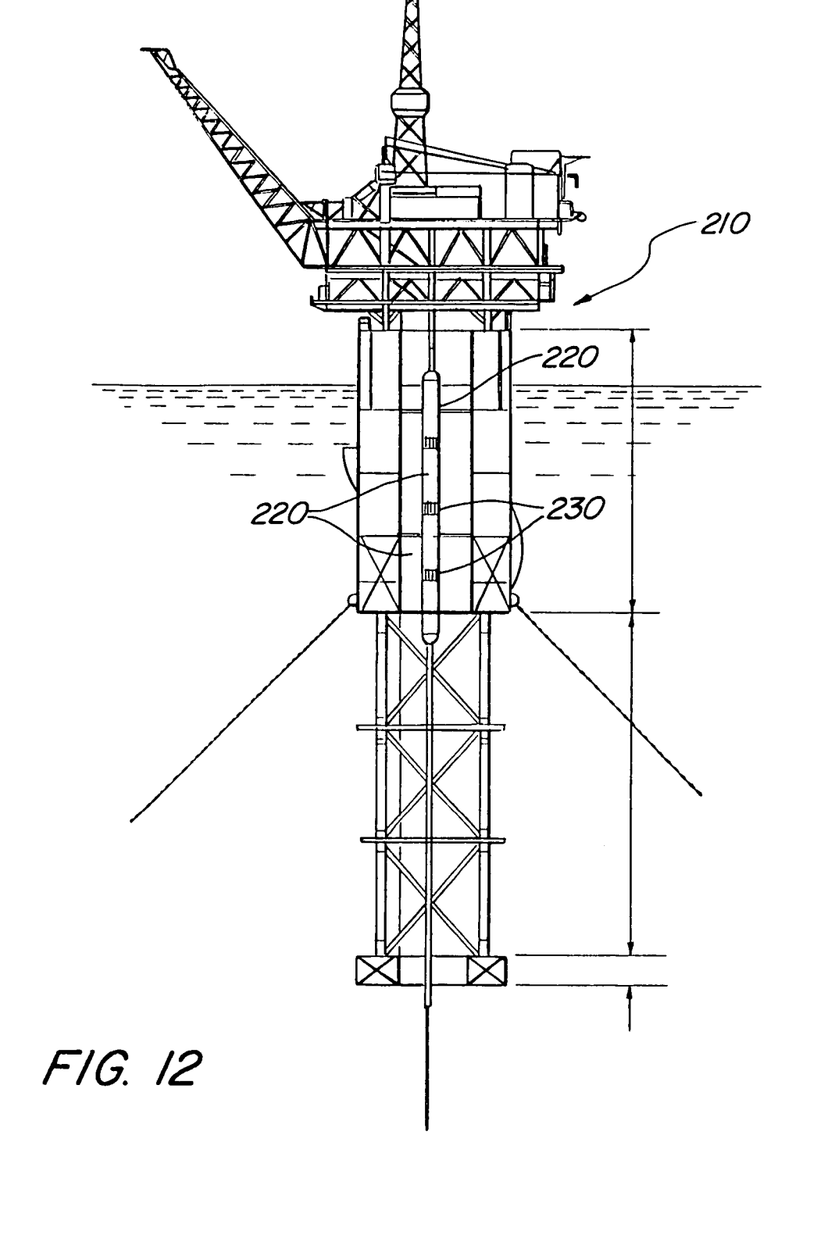
FIG. 12 illustrates a riser arrangement in a truss spar platform.

FIGS. 11 and 12 respectively show the arrangement of the risers in two types of spars: the Caisson Spar 200 (cylindrical) and the "Truss" spar 210, respectively. There may be as many as forty production risers passing through a single centerwell. Buoyancy cans 220, typically cylindrical, are located on the risers, and they are separated from each other by a rectangular grid structure referred to as riser guides 230.

These guides are attached to the hull. As the hull moves the risers are deflected horizontally with the guides. However, the risers are tied to the sea floor, hence as the vessel heaves the guides slide up and down relative to the risers (from the viewpoint of a person on the vessel it appears as if the risers are sliding in the guides).

Figure 13:
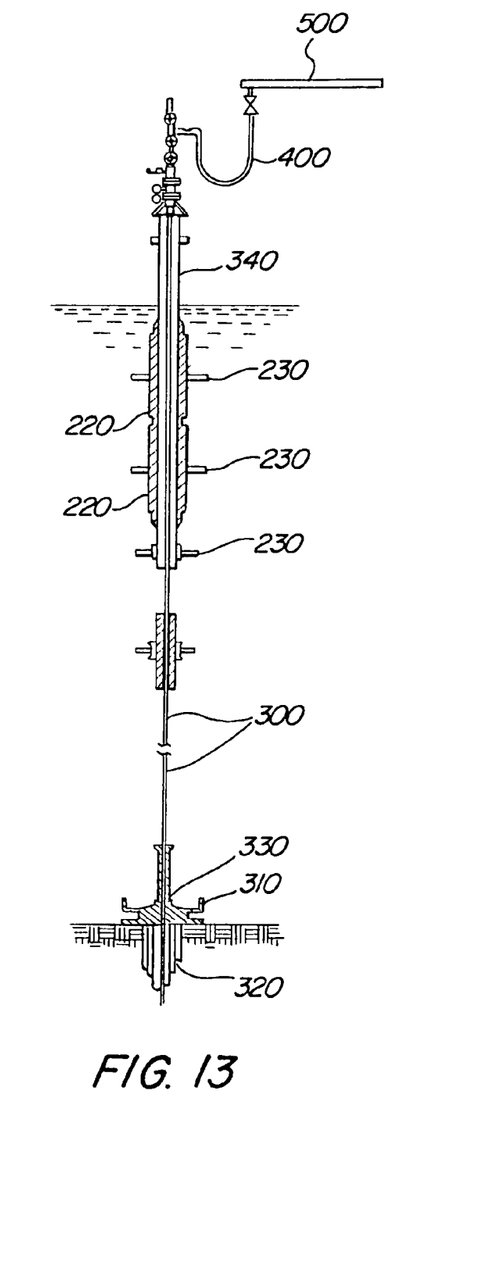
FIG. 13 illustrates a single spar production riser.
Figure 14:
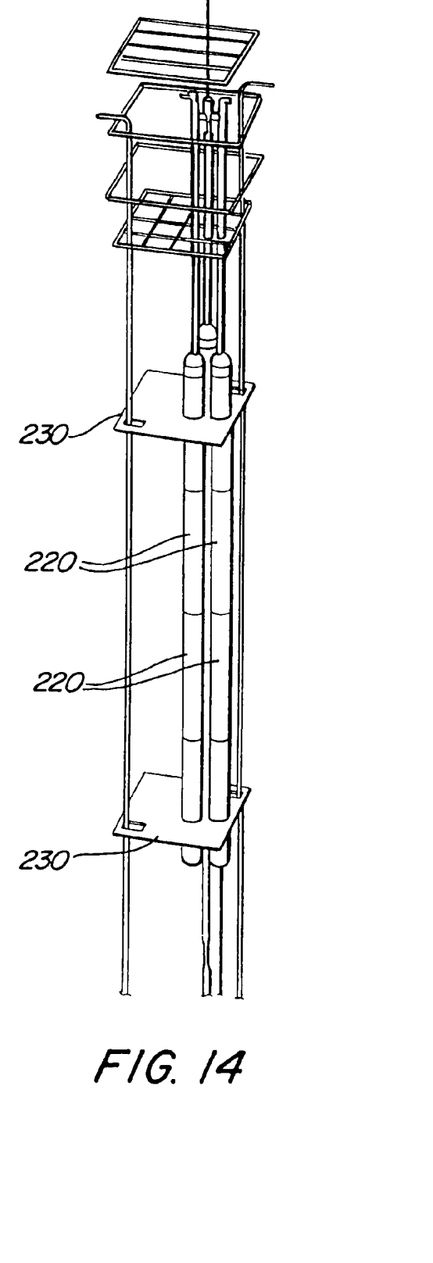
FIG. 14 illustrates buoyancy cans and guides in a spar platform centerwell.
Figure 15:
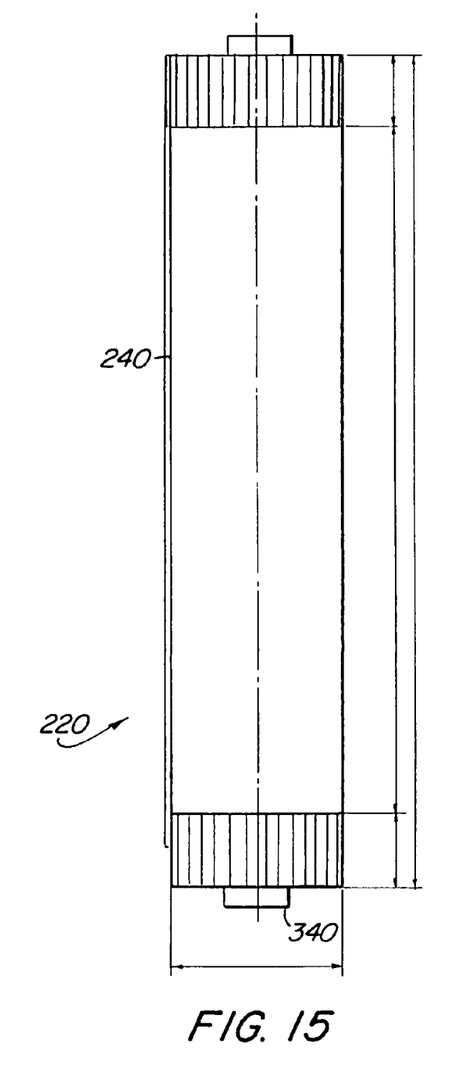
FIGS. 15 and 16 illustrate a typical buoyancy can design showing the outer shell and stem.
Figure 16:
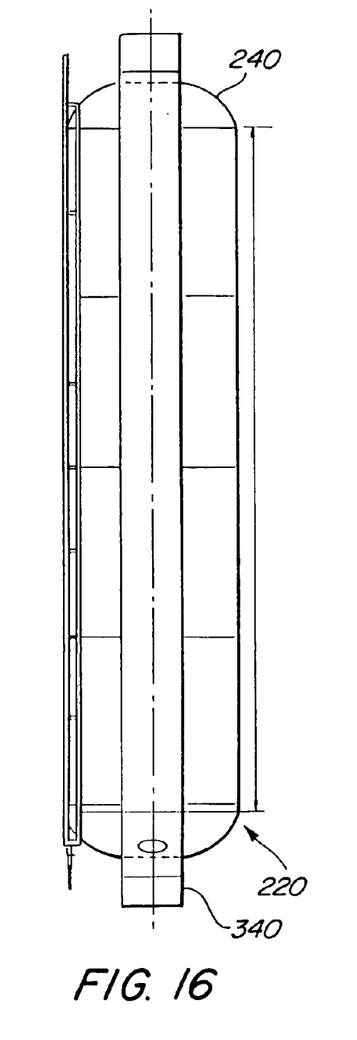

FIG. 13 shows the arrangement for a single spar production riser 300. A wellhead 310 at the sea floor connects the well casing 320 (below the sea floor) to the riser with a special tieback connector 330. The riser, typically 9"–14" pipe, passes from the tieback connector through the bottom of the spar and into the centerwell. Inside the centerwell the riser passes through a stem pipe 340, or conduit, which goes through the center of the buoyancy cans. This stem extends above the buoyancy cans themselves and supports the platform to which the riser and the surface wellhead are attached. The buoyancy cans need to provide enough buoyancy to support the required top tension in the risers, the weight of the cans and stem, and the weight of the surface wellhead. FIG. 14 illustrates buoyancy cans and guides in a spar centerwell. FIGS. 15 and 16 illustrate a typical buoyancy can design showing an outer shell 240 surrounding the stem 340.

Since the surface wellhead ("dry tree") move up and down relative to the vessel, flexible jumper lines 400 (FIG. 13) connect the wellhead to a manifold 500 which carries the product to a processing facility to separate water, oil and gas from the well stream.

Spacing between risers is determined by the size of the buoyancy cans. This is an important variable in the design of the spar vessel, since the riser spacing determines the centerwell size which in turn contributes to the size of the entire spar structure. This issue becomes increasingly more critical as production moves to deeper water because the amount of buoyancy required increases with water depth. The challenge is to achieve the buoyancy needed while keeping the length of the cans within the confines of the centerwell, and the diameters to reasonable values.

The efficiency of the buoyancy cans is compromised by several factors, as follows:

Internal Stem

The internal stem is typically flooded and provides no buoyancy. Its size is dictated by the diameter of the sea floor tieback connector, which is deployed through the stem. These connectors can be up to 50" in diameter.

Solutions to this loss of buoyancy include:
1. Adding compressed air to the annulus between the riser and the stem wall after the riser is installed, and
2. Making the buoyancy cans integral with the riser so they are deployed after the tieback connector is installed.

Adding air to the annulus is efficient use of the stem volume, but the amount of buoyancy can be so large that if a leak occurs there could be damage to a riser. The buoyancy tanks are usually subdivided so that leakage and flooding of any one, or even two, compartments will not cause damage.

Making the buoyancy cans integral with the risers has been used, but this requires a relatively small can diameter for deployment with the surface rig, and the structural connections between the cans and the riser are difficult to design.

Circular Cans

The circular geometry of the cans leaves areas of the centerwell between cans flooded which could provide buoyancy if the cans were rectangular. Studies have shown, however, that rectangular or square cans have a greater structural weight and that the net buoyancy, i.e. the difference of the buoyancy and the can weight, is actually greater with the structurally more efficient circular shape.

Weight of the Cans

The buoyancy cans are typically constructed out of steel and their weight can be a significant design issue. The first spar buoyancy cans were designed to withstand the full hydrostatic head of the sea, and their weight reflected the thicker walls necessary to meet this requirement. Subsequent designs were based on the cans being open to the sea at their lower end, with compressed air injected inside to evacuate the water. These cans only have to be designed for the hydrostatic pressure corresponding to the can length, and this is an internal pressure requirement rather than the more onerous external pressure requirement.

Recently, studies have suggested that buoyancy cans could be fabricated from composite materials at costs which would be competitive with steel cans, and which would reduce the can weight significantly. These composite buoyancy modules (CBMs) are the subject of a separate patent application entitled Composite Buoyancy Module, filed Jul. 20, 2000 having a docket number T8803PROV.

The subject of this invention is a method for cost effective utilization of the space between the riser and the stem wall, and the flooded volumes between the circular buoyancy cans and the riser guides. The method uses specially designed composite modules, which are configured to straddle the riser pipe and steel buoyancy modules in a way to use the available flooded volume for additional buoyancy.

Other methods than those proposed here are feasible: in particular it is possible to shape and install closed cell syntactic foam modules in these areas to provide additional buoyancy. Syntactic foam modules are commonly used, especially on drilling risers, to add buoyancy to the risers and reduce the top tension requirement. The primary advantages of the proposed invention over this more conventional means of adding buoyancy include:
1. Syntactic foam density is about 2–3 times as expensive as that derived from the proposed composite cans (based on cost per unit of net buoyancy), and
2. Low density foam which is more cost effective in the shallow water applications such as the spar centerwell is subject to some water absorption and loss of buoyancy with time.

While the above discussion focused on the problem of utilizing flooded volume for buoyancy on a spar type riser system, this invention has other similar applications, for example, as a replacement for syntactic foam on drilling risers, or free standing production risers.

The arrangement of CBMs around a pipe can be such as to enhance the pipes hydrodynamic behavior in currents and waves. For example, arranging the CBMs in a spiral wrapped arrangement would have an effect similar to helical strakes to mitigate Vortex Induced Vibrations of pipes exposed to current or waves. Alternatively, placing the CBMs on one side would have an effect similar to fairing the pipe to reduce drag.

BRIEF SUMMARY OF THE INVENTION

The present invention relates to methods of designing, constructing, attaching and using buoyancy systems for water covered areas. Various objects of invention are addressed in the above-mentioned problems. For example, according to one aspect of the invention, a buoyancy system for a structure having at least one component being substantially stationary with respect to the bottom of a water covered area is employed. This system comprises a set of buoyancy modules of engineered materials to apply an identified amount of buoyancy. The set of buoyancy modules are attached to the structure at a set of buoyancy load transfer locations.

According to another aspect of the invention, a buoyant riser comprises a set of engineered-material buoyancy modules connected to the riser.

In a further example embodiment of the invention, a system of applying buoyancy to a member is adopted. This system comprises means for constraining a plurality of engineered material buoyancy members in a metal container, wherein said constraining is arranged to assert a buoyant force, and means for applying the buoyancy force of the metal container to the member.

Another aspect of the invention involves a system of applying buoyancy to a riser. That system comprises means for asserting a first portion of the buoyancy force required to lift the riser at a first buoyancy load location on the riser with a first buoyancy member, means for protecting the first buoyancy member from entry of fluid, means for asserting a second portion of the buoyancy force required to lift the riser at a second buoyancy load location on the riser with a second buoyancy member, and means for protecting the second buoyancy member from entry of fluid.

Some embodiments of the invention utilize a system of applying buoyancy to a member. This system comprises means for resiliently constraining a mass having a density less than water and means for asserting, with the resiliently constrained mass, at least a portion of the buoyancy force required to lift the member at a buoyancy load location on the member.

Still another embodiment of the invention applies a method of designing a buoyancy system for a structure having at least one component being substantially stationary with respect to the bottom of a water covered area. Some of such methods comprise identifying the amount of buoyancy required by the buoyancy system, wherein an identified amount of buoyancy results, identifying a set of buoyancy modules of engineered material to apply the identified amount of buoyancy, and identifying a location with respect to the structure for the set of buoyancy modules.

In accordance with another embodiment, the invention comprises a method of increasing the redundancy of a buoyancy in a stem pipe for a riser. In this embodiment, the method comprises applying a set of engineered-material buoyancy modules to the riser, and inserting the riser with the set of engineered-material buoyancy modules attached to the stem pipe.

A still further example of the present invention comprises a method of applying buoyancy to a member. The method comprises constraining a plurality of engineered material buoyancy members in a metal container, wherein said constraining is arranged to assert a buoyant force, and applying the buoyancy force of the metal container to the member.

In addition some embodiments of the invention comprise a method of applying buoyancy to a riser. A number of such methods comprise asserting a first portion of the buoyancy force required to lift the riser at a first buoyancy load location on the riser with a first buoyancy member, protecting the first buoyancy member from entry of fluid, asserting a second portion of the buoyancy force required to lift the riser at a second buoyancy load location on the riser with a second buoyancy member, and protecting the second buoyancy member from entry of fluid.

Yet another embodiment of the invention comprises a method of applying buoyancy to a member. That method comprises resiliently constraining a mass having a density less than water and asserting, with the resiliently constrained mass, at least a portion of the buoyancy force required to lift the member at a buoyancy load location on the member.

In accordance with various embodiments, the invention comprises an apparatus for providing buoyancy to a submerged riser attached at its lower end to a well head on the sea floor. This apparatus comprises a plurality of submerged buoyancy modules associated with the riser for imparting an upward buoyancy force to the riser, wherein the buoyancy modules comprise lightweight material selected from a group consisting of glass fiber/polymeric resin, carbon fiber/polymeric resin, hybrid glass/carbon fiber polymeric resin, rubber reinforced with nylon fibers, and rubber reinforced with steel fibers.

Further embodiments comprise an apparatus for providing buoyancy to a submerged riser attached at its lower end to a well head on the sea floor. That apparatus comprises a plurality of submerged buoyancy modules associated with the riser for imparting an upward buoyancy force to the riser, wherein each buoyancy module is hollow and has an elongated shape with a longitudinal axis and is vertically oriented, the longitudinal axis of the buoyancy module being generally parallel to the longitudinal axis of the riser, some of the buoyancy modules being disposed at different vertical elevations along the riser in an arrangement so as to provide improved hydrodynamic performance to the riser, wherein each buoyancy module comprises a layered exterior wall, wherein each layer of the wall has a specific function, and wherein the layers include one or more of hoop layers to resist internal and external pressure, axial layers to carry axial loads, polymeric liners to prevent fluid leakage through the wall, and selective reinforcing layers to provide damage tolerance at assembly contact locations and at buoyancy load transfer locations, and straps for attaching the buoyancy modules to the riser, the straps passing around the outer circumference of the buoyancy modules.

These and many other embodiments and advantages of the present invention will be obvious to one of ordinary skill in the art upon review of the Detailed Description in conjunction with the following figures.

DETAILED DESCRIPTION OF EXAMPLE EMBODIMENTS OF THE INVENTION

According to one example embodiment of the invention, airtight composite buoyancy modules (CBMs) provide buoyancy to attached objects submerged underwater. Different sizes and shapes of CBMs are attached in various embodiments to, for example, production risers, drilling riser, category risers, air cans, and stem pipe.

In the example embodiments illustrated, buoyancy is provided by trapping air inside structures of engineered materials (for example: glass fiber/polymeric resin, carbon fiber/polymeric resin, hybrid glass/carbon fiber polymeric resin, engineered rubber reinforced with nylon or steel fibers).

Figure 1:
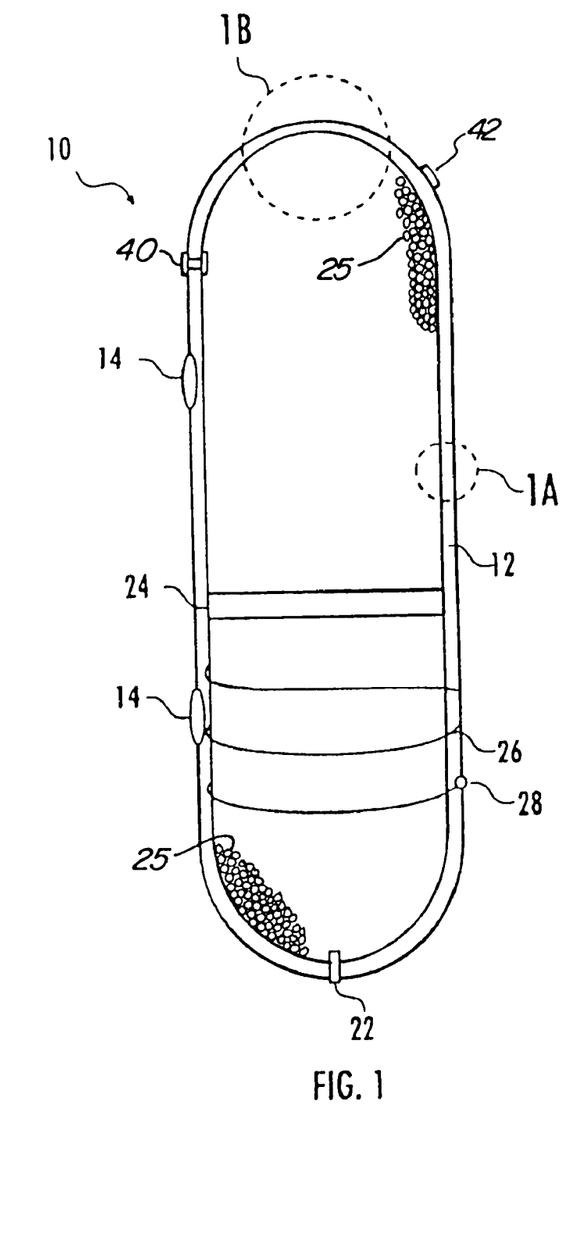
FIG. 1 depicts a composite buoyancy module.
Figure 1A:
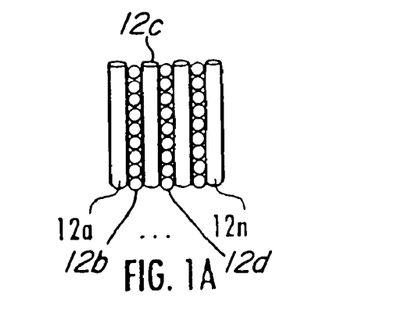
FIG. 1a depicts detailed illustrations of layering of engineered materials.

Referring now to FIG. 1, a CBM 10 is seen, having a wall 12 of layers 12a–12n (seen in FIG. 1a) of engineered materials. Various of the layers 12a–12n have differing functions. For example, some of the layers 12b and 12d comprise substantially reinforced hoop layers (substantially horizontal orientation of fiber) to resist internal and external pressure. Other layers 12a and 12c comprise substantially reinforced axial layers (substantially vertical fibers) to carry axial loads. Still other layers (not illustrated) comprise internal polymeric liners to prevent air leakage to outside and water leakage to inside, outside polymeric liners to prevent water leakage to inside and air leakage to outside, layers to provide damage tolerance (e.g. thick, but unreinforced layers and/or layers of materials differing from those of the adjacent layers, or layers having differing microstructures from other layers—honeycomb layers, etc.), and selective reinforcing layers 14 (FIG. 1) at the contact/assembly locations. Further, in accordance with a more specific embodiment of the invention, fiber optic 26 is manufactured in or between layers 12a–12n for use in monitoring the state of the CBM 10. Any variety of combinations of layers are used in alternative embodiments of the invention, there being no particular layer combination that must be used in all embodiments of the invention. Further, there is no particular single layer type that must be used in every embodiment of the invention.

Figure 1B:
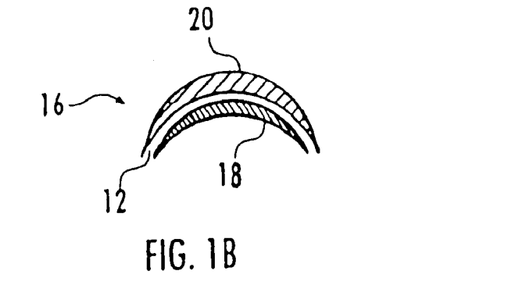
FIG. 1b is a partial view at one end of a composite buoyancy module, illustrating selective reinforcement for buoyancy load transfer.
Figure 2A:
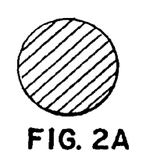
FIG. 2a is a cross-sectional view taken through a composite buoyancy module having a circular cross-sectional shape.
Figure 2B:
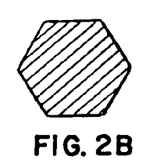
FIG. 2b is a cross-sectional view taken through a composite buoyancy module having a polygonal cross-sectional shape.
Figure 2C:
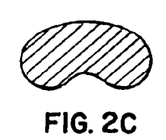
FIG. 2c is a cross-sectional view taken through a composite buoyancy module having a saddle shaped cross-section.
Figure 2D:
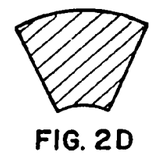
FIG. 2d is a cross-sectional view taken through a composite buoyancy module having a pie shaped cross-section.
Figure 2E:
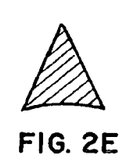
FIG. 2e is a cross-sectional view taken through a composite buoyancy module having a triangular cross-sectional shape.

Referring again to FIG. 1, selective reinforcement at the buoyancy load transfer locations 16 is provided in some embodiments. In one such embodiment, seen in FIG. 1b, reinforcing member 18 (for example, a metal or other load-bearing material, in a more specific example, corrosion-resistant alloy ("CRA")) is provided to support wall 12. Optional selective reinforcement 20 is seen for further load transfer aid.

Referring again to FIG. 1, an example penetration 22 is seen, which is provided in some embodiments for air pressurization. A further penetration 26 is seen for passing of fiber optic 26. It will be noted that the location of penetrations is dependant upon the use of the penetration, and, while shown both on the side and at the end of CBM 10, penetrations at the end of CBM 10 are preferable for many applications. Other uses of such penetrations include water purging and other functions that will occur to those of skill in the art. Multiple penetrations are contemplated in various embodiments; however, in some embodiments single or no penetrations are used. Also seen in FIG. 1 is a bulkhead 24, used on some embodiments to increase the collapse resistance of the CBM 10. Bulkhead 24 is also used on some embodiments to add redundancy.

In many embodiments of the invention wall 12 of CBM 10 is designed to leak before collapse or burst. In still further embodiments, the functional status of the CBM 10 is detected by monitoring the pressurizing system and/or air flow rate into the system. In still further embodiments, wall 12 is designed such that, in the case of burst, the CBM is not shattered into large pieces. In an even further embodiment, when the CBMs fail due to leakage of water inside the chamber, the structural integrity of the CBM is maintained such that it can carry axial loads without providing buoyancy. In some embodiments, CBM 10 is filled with a low density material, such as closed cell syntactic foam or flowable microspheres 25. Also, in some embodiments, CBM 10 includes a sensor 40 for sensing buoyancy module failure. In various embodiments, sensor 40 is an interior-exterior pressure difference sensor, an interior pressure sensor, an interior temperature sensor, or an interior moisture sensor. In another embodiment, CBM 10 includes a buoyancy force transfer monitor 42 on its exterior wall 12 for sensing buoyancy module failure.

Referring now to FIGS. 2a–2e, CBM 10 has, in alternative embodiments, a cross section of circular, polygonal, saddle, pie, or triangular shape. Other shapes will occur to those of ordinary skill without departing from the spirit of the invention. Also, length of the CBM 10 is variable (for example, between 1 ft. to 50 ft.), depending on the manufacturing process or the attachment requirements.

Figure 3A:
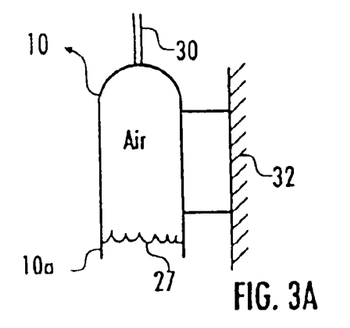
FIG. 3a depicts an example air containment system wherein the mass is held by a manufactured material having an open bottom with a substantially constant pressure supplied by a vessel.
Figure 3B:
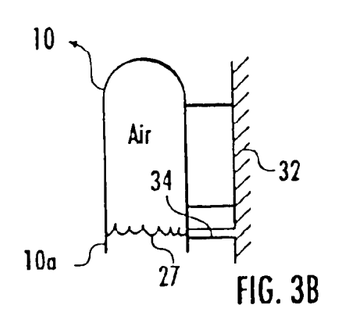
FIG. 3b depicts an example air containment system wherein the mass is held by a manufactured material having an open bottom with a substantially constant pressure supplied by an attached object.

Referring now to FIGS. 3a–3d, in still further embodiments, air, or any other material that is less dense than water, is trapped inside the CBM 10. In FIG. 3a, the CBM 10 is open to water 27 at the bottom 10a. The amount of water inside the CBM is varied by supplying air from a supply line 30 connected to a supply (not shown) located at the surface facilities (not shown). Alternatively, as seen in FIG. 3b, air is plumbed through supply 34 from the object 32 (e.g., a steel air can, neighboring CBM, etc.) to which the CBM 10 is attached. In embodiments providing for pressure supply, the buoyancy of the system is adjusted, both on location and during installation. Thus, for example, during installation the buoyancy is adjusted in some embodiments so that the CBM 10 does not provide upward thrust.

Figure 3C:
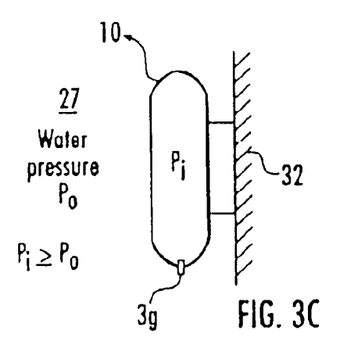
FIG. 3c depicts an example pressured and enclosed mass containment system.

Referring now to the embodiment of FIG. 3c, the CBM 10 is designed for internal pressure loads. In one example use embodiment of the invention, CBM 10 is pressurized through penetration 39 on the surface. Then, when CBM 10 is submerged, hydrostatic pressure Po works against the internal pressure Pi and balances the load, simplifying the design of wall 12. In such cases, less material/layers (or weaker material/layers) is needed than in embodiments in which there is a high external pressure differential. In further embodiments, the internal pressure is used to test the CBM for leaks.

Figure 3D:
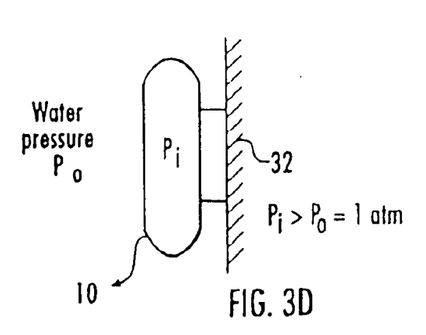
FIG. 3d depicts an example enclosed mass containment system.
Figure 4A:
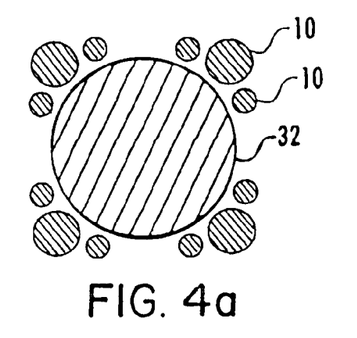
FIGS. 4a–4e depict aspects of the invention comprising various buoyancy module configurations with improved hydrodynamic properties.
Figure 4B:
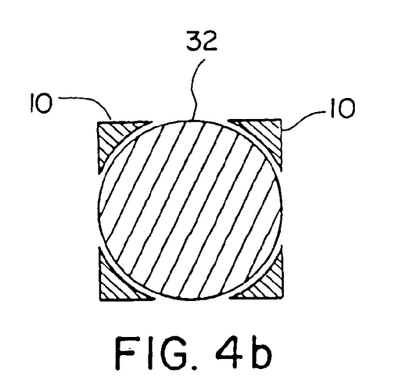
Figure 4C:
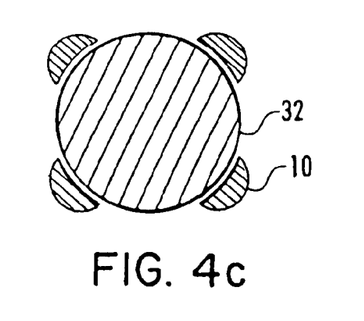
Figure 4D:
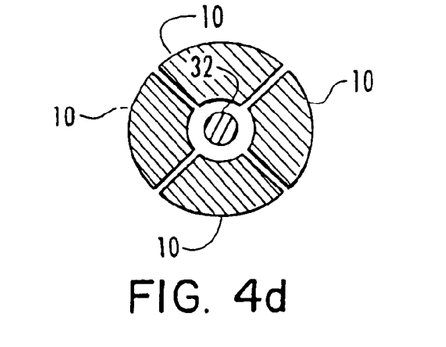
Figure 4E:
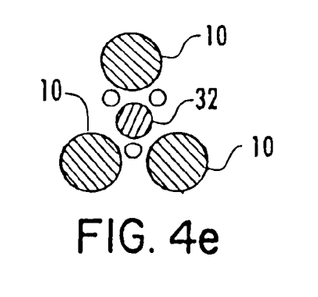

Referring now to FIG. 3d, a more simple embodiment is seen in which internal pressure P$i$ in CBM 10 is below that of the pressure P$o$ outside CBM 10 (for example, one atmosphere), and CBM 10 is constructed without a penetration and with sufficient strength to take the full hydrostatic pressure loads.

In still a further embodiment, CBM 10, from what ever drawing mentioned above, comprises a rubber wall 12. In a more specific embodiment, wall 12 comprises a reinforced rubber walls allowing for deflection, reducing the potential for damage of CBM 10.

Referring now to FIGS. 4a–4e, various system embodiments of the invention are seen, in which various numbers, sizes, and/or shapes of CBMs 10 are attached to an object 32 to which added buoyancy is desired. The CBM 10 increases the effective hydrodynamic diameter of the attached object. By arranging the CBM assembly to different shapes the drag and lift coefficients of the system can be optimized.

Figure 6A:
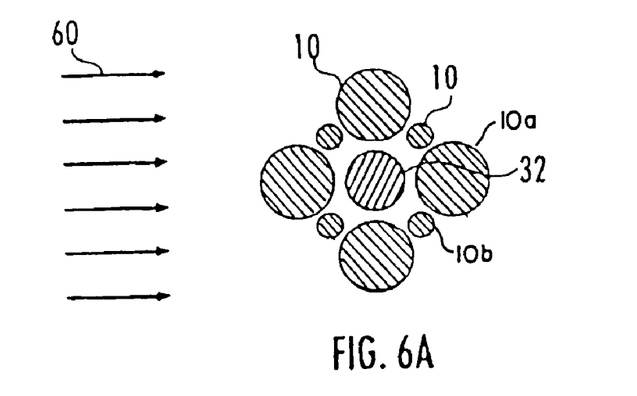
FIGS. 6a–6c depict aspects of the invention comprising various buoyancy module configurations and shapes with associated water current patterns.
Figure 6B:
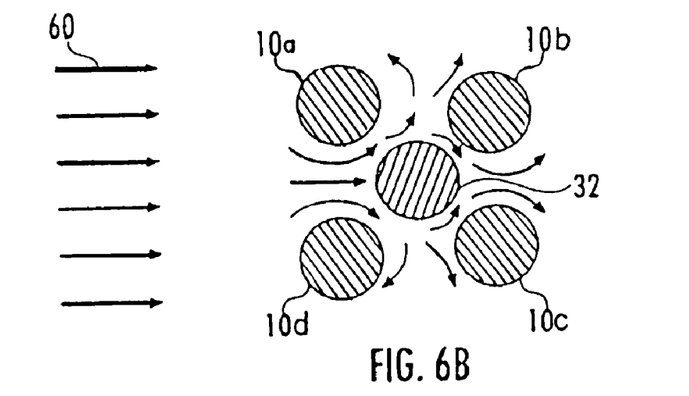
Figure 6C:
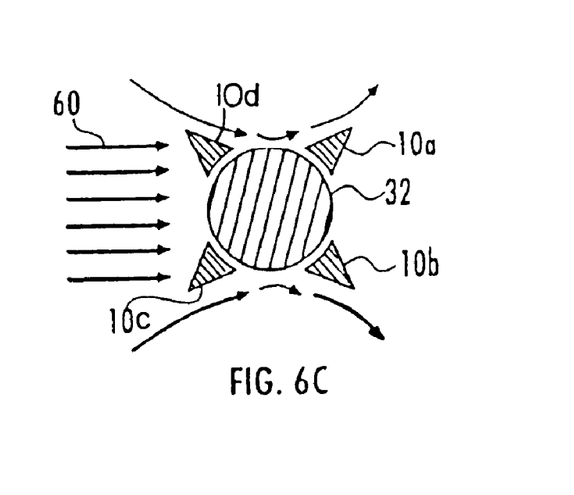
Figure 7A:
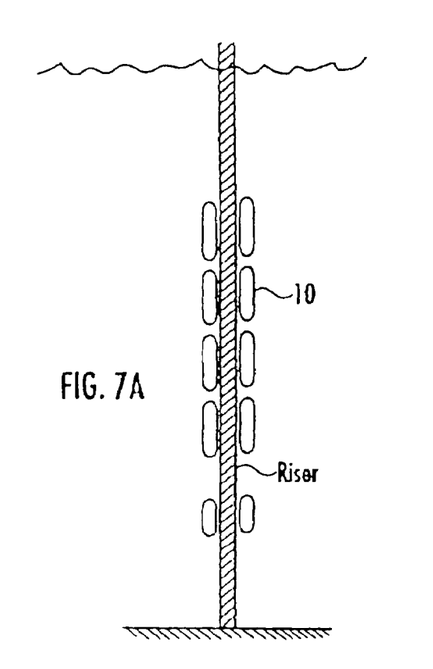
FIGS. 7a–7e depict aspects of the invention comprising various riser applications.
Figures 7B, 7C:
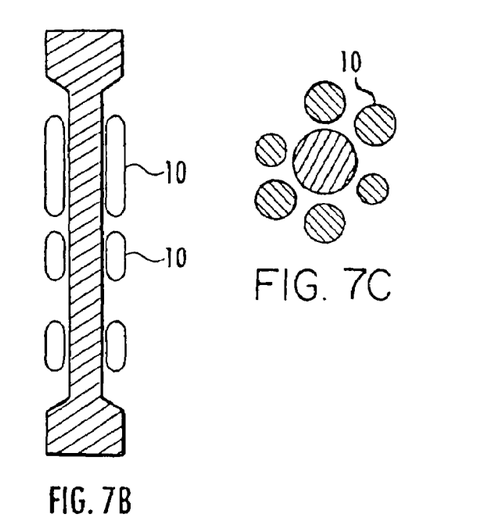
Figure 7D:
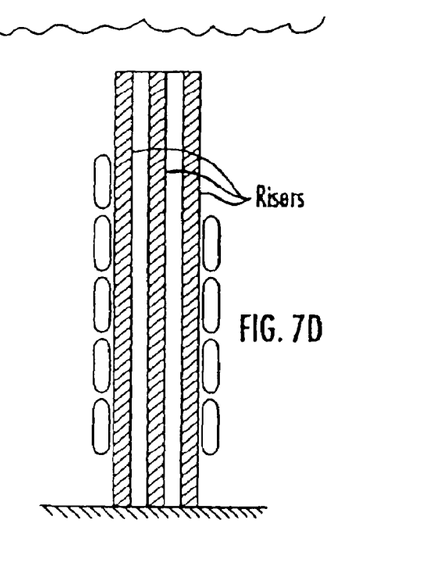
Figure 7E:
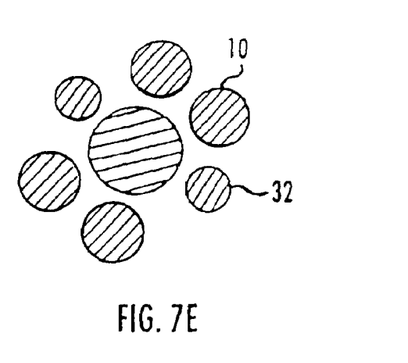

Referring now to FIGS. 6a–6c, embodiments are seen in which hydrodynamic performance is adjusted. In the embodiment of FIG. 6a, for example, in which CBM 10a is a size different from CBM size 10b, the current 60 is disrupted from the pattern it would normally take around the shape of the attached object 32 on which additional buoyancy is desired. A variety of patterns is available through selection of size and orientation of the CBMS. In FIG. 6b, an example embodiment is seen in which CBMs 10a–10d are attached to member 32 such that current 60 passes both around CBMs 10a–10d and between CBMs 10a–10d and member 32. Again, various patterns are available through selection of the size, number, and orientation of the CBMS. Likewise, shape of the CBMs affects the hydrodynamic performance. As seen in FIG. 6c, CBMs 10a–10d are of a non-circular cross-sectional shape, in this case a triangle. Again, variation in number, relative size and orientation also are combined in even further alternative embodiments. Likewise, other shapes are also within the scope of the invention.

Figure 9A:
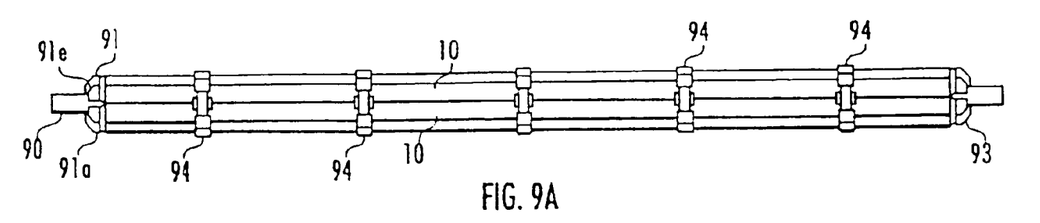
FIG. 9a depicts an example assembly of five CBM's on a riser joint.
Figures 9B, 9D:
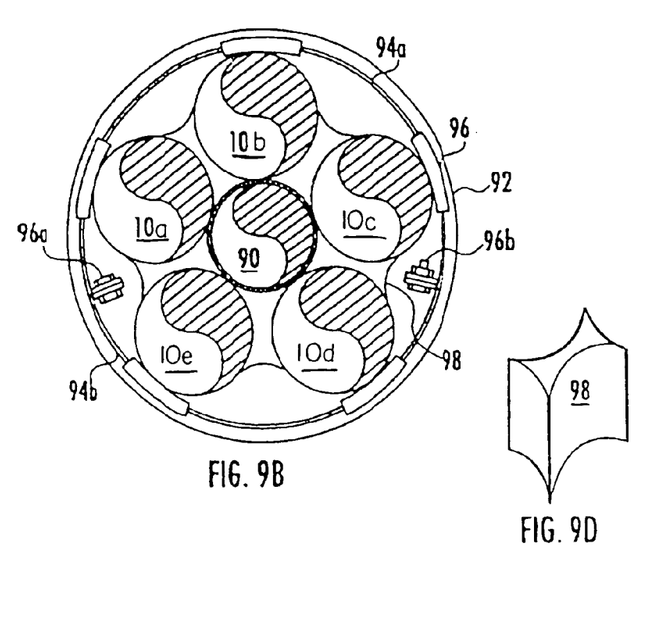
FIGS. 9b–9d depict various details of the example assembly of five CBM's on a riser joint.

Referring now to FIG. 9b a more specific example of an assembly of 5 CBMs 10a–10e on a riser joint 90 is seen, suitable for installation in (as seen in FIG. 9b) a 51" stem pipe 92. Referring to FIG. 9a, the CBMs 10a–10e are attached to riser joint 90 with retaining rings 94. A thrust plate assembly 91, with gussets 91a–91e, transfers the buoyancy forces from the CBMs 10a–10e to riser joint 90. Stopper assembly 93 prevents CBMs 10a–10e from shifting axially down riser joint 90. Alternative embodiments of thrust plate assembly 91 and stopper 93 will occur to those of ordinary skill in the art.

Figure 9C:
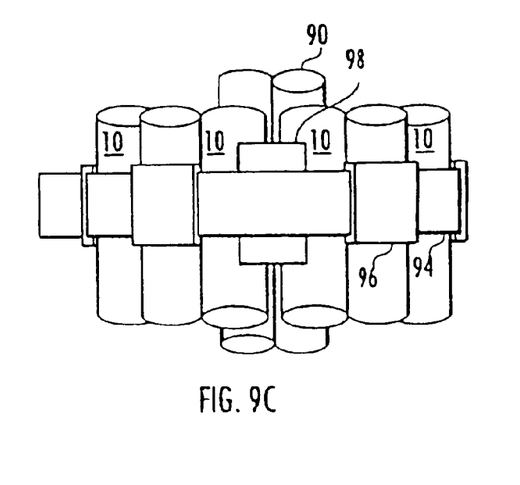

Referring now to FIGS. 9b–9d, retaining ring 94 holds CBMs 10a–10e concentrically around riser 90 with spacers 98 to centralize the CBMs 10a–10e, avoid damage to the CBMS. Acceptable materials for spacers 98 include: rubber, HDPE, Teflon, extruded polymers, and other materials that will occur to those of skill in the art. Bumpers 96 prevent the CBMs from being damaged during installation. Acceptable materials for bumpers 96 include: rubber HDPE, Teflon, extruded polymers, and other materials that will occur to those of skill in the art. Retaining ring 94 comprises semi-rings 94a and 94b, attached by flange, nut, and bolt assemblies 96a and 96b. Other attachments of semi-rings 94a and 94b will occur to those of skill in the art (e.g. welds, rivets, clamps, locking tabs, etc.). Further, other ring assemblies will occur to those of skill in the art without departing from the spirit of the invention. In some specific embodiments, the material of ring 94 comprises material such as, for example: CRA alloys, Kevlar straps, and other tension bearing members and/or fabrics.

Figure 5A:
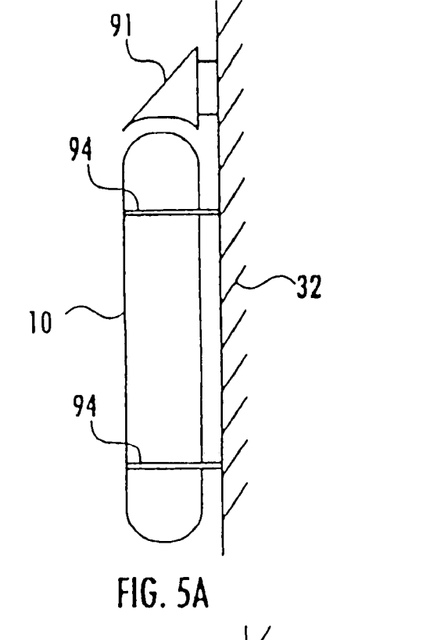
FIGS. 5a–5c depict example buoyancy load transfer systems.
Figure 5B:
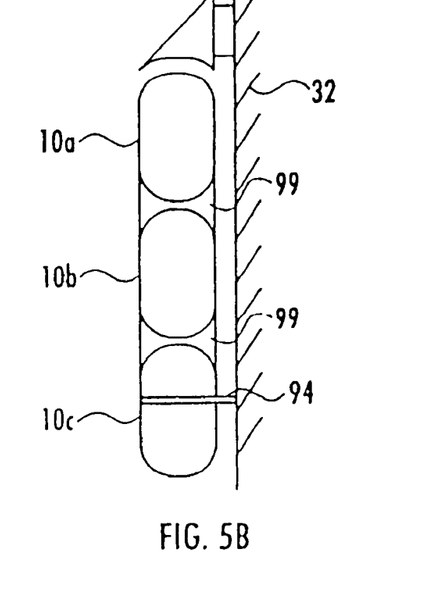

Referring now to FIGS. 5a–5b, various exemplary embodiments are seen of CBMs 10 attached to members or attached objects 32 to provide buoyancy to members or attached objects 32. In FIG. 5a, for example, a single, long CBM lO is attached with a thrust plate 91 and rings 94. To add redundancy and reduce the danger of the loss of any single CBM causing insufficient buoyancy, FIG. 5b shows the same amount of buoyancy for the member 40 by using multiple CBMs in a stacked arrangement alone a common vertical axis. In FIG. 5b, a load transfer member or skirt 99, preferably of elastomeric material, transfers the buoyancy forces between CBMs 10a–10c to thrust plate 91. The use of modular CBMs in an overall CBM system with load transfer members 99 results in the replacement of the single CBM of the example of FIG. 5a. Thus, if CBM 10b leaks and provides no buoyancy, the structure of CBM 10b is sufficient to transfer the buoyancy load of CBM 10c to CBM 10a and to thrust plate 91. According to an even further embodiment of the invention, the CBM assembly of FIG. 5b is assembled in modular form, wherein a damaged part is removed and replaced, again obtaining advantages over the embodiment of FIG. 5a or the earlier air cans.

Figure 5C:
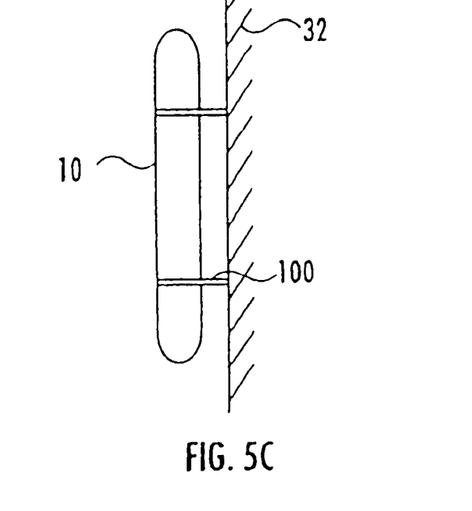

In still a further embodiment, seen in FIG. 5c, a single CBM or even a CBM assembly such as what is seen in FIG. 5b, is attached to member 32 with clamps 100, and the buoyancy load is transferred to member 32 through the friction interaction between the CBM assembly, the clamps, and the surface of the member.

According to various embodiments of the invention, various manufacturing processes are used to make the CBMs and CBM assembles discussed above. For example, one such method comprises filament winding of CBMs (most suitable for cylindrical uniform cross-section elements). Another acceptable method comprises resin transfer molding (suitable for non-symmetric cross-section elements). Hand lay-up walls on "pultruded" composite elements would constitute yet a further acceptable manufacturing embodiment. Other manufacturing processes will occur to those of skill in the art.

According to an even further embodiment of the invention, systems are configured with a large number of CBMs such that each CBM will supply only a small fraction of total required buoyancy. By dividing the buoyancy elements into smaller units overall system redundancy is increased. The CBMs are designed to be inspectable and easily repairable/disposable. FIGS. 7a–7d illustrate more specific embodiments in which CBMs are applied to top tension risers. The CBMs are placed at different locations along the riser, rather than using a few large buoyancy elements.

Figure 8A:
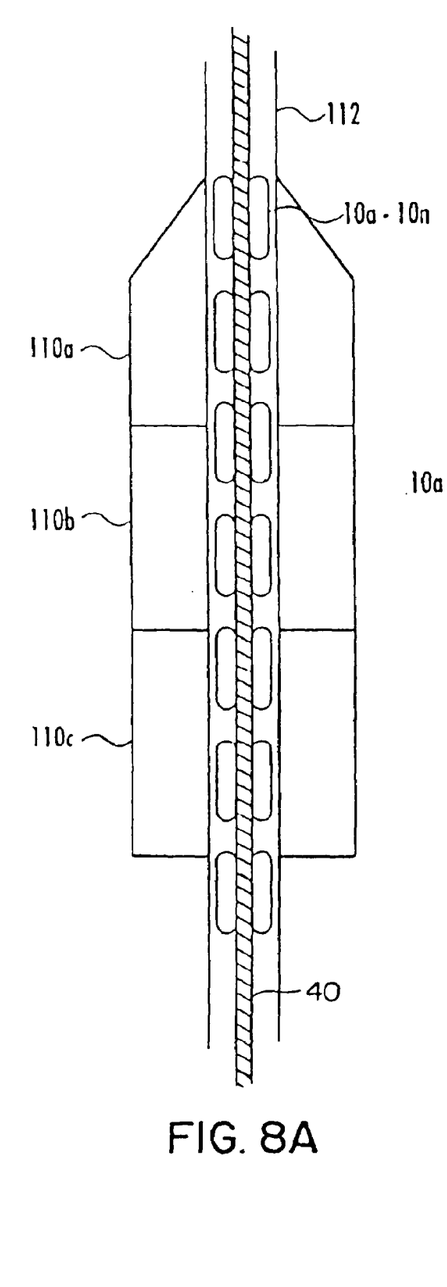
FIGS. 8a–8b depict various center stem, riser, and buoyancy can applications.
Figure 8B:
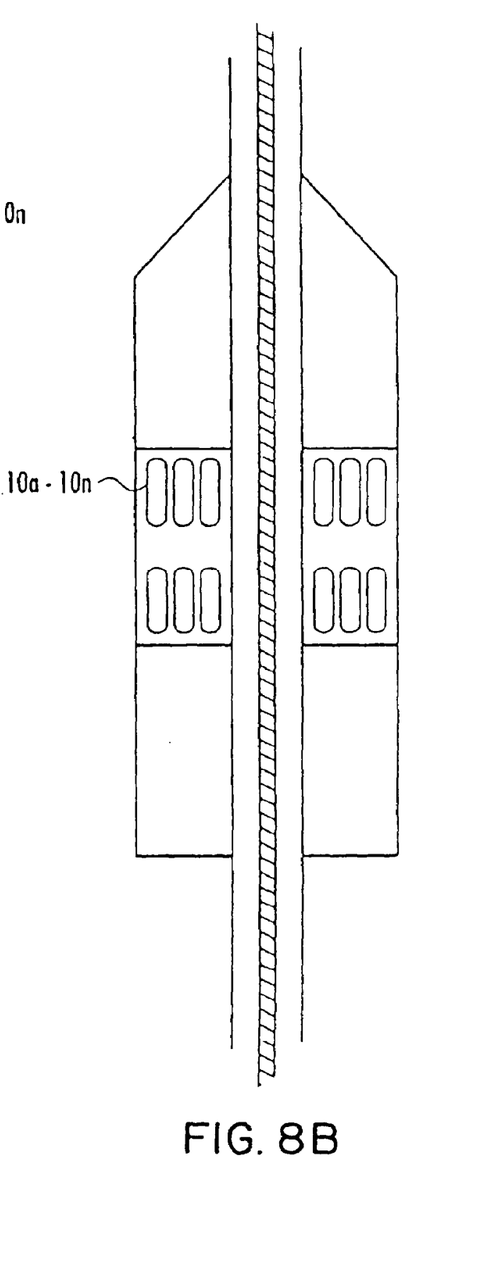

In still a further embodiment, FIG. 8a is an application of CBMs for a spar riser system. A large portion of the buoyancy required by the system is provided by the steel air can, divided into multiple chambers 110a–110c. Without CBMs, the interior of stem 112 is not normally counted upon for buoyancy, because it is too large and uncompartmentalized. A leak in the stem, anywhere, results in a loss of all of the buoyancy. Attachment of the CBMs 10 to the riser 40 as shown allows the stem interior to be used, reliably, for buoyancy. The loss of one or even many of the CBMs 10 in such an embodiment does not mean the loss of all of the buoyancy of the stem. Likewise, the loss of air pressure within the stem itself does not affect the buoyancy provided by the CBMs. Therefore, the FIG. 8a buoyancy system is designed for failure of several chambers. Likewise, the compartments 110*a*–110*c* of the air can 110 are large, and a small leak can cause the loss of buoyancy of all of the compartment. Therefore, in still a further embodiment, seen in FIG. 8*b*, multiple CBMs are applied to the interior of air can compartments 110*a*–110*c*, again to add redundancy.

The invention claimed is:

1. Apparatus for providing buoyancy to a submerged object defining a first longitudinal axis and an outer circumference, the apparatus comprising:

a plurality of buoyancy modules attachable in a concentric arrangement around the outer circumference of the submerged object so as to impart an upward buoyancy force to the submerged object, wherein each of the buoyancy modules defines a second longitudinal axis that is spaced from and generally parallel to the first longitudinal axis of the submerged object to which the module is attached, wherein at least some of the buoyancy modules are disposed in a vertically-stacked arrangement along a common vertical axis, and wherein the ends of adjacent pairs of modules in the stacked arrangement are connected together by load-transferring skirts conforming to the shapes of the ends of the modules.

2. The apparatus of claim 1, wherein each module has a cross sectional shape on a plane perpendicular to its second longitudinal axis that is a shape selected from the group consisting of a circle, a triangle, a square, a polygon, a hexagon, a truncated pie slice, and a saddle.

3. The apparatus of claim 1, wherein at least some of the buoyancy modules are disposed at the same vertical elevation on the object, but are distributed uniformly around the outer circumference or the object in a geometrical arrangement so as to provide improved hydrodynamic performance to the object.

4. The apparatus of claim 1, wherein the skirts comprise elastomeric material.

5. The apparatus of claim 1, wherein the buoyancy modules comprise a material selected from the group consisting of composite material and steel.

6. A buoyancy system that is attachable to a riser extending from the seabed to an offshore floating platform, the riser having an outer circumference and a submerged portion defining a first longitudinal axis, the buoyancy system comprising:

a plurality of buoyancy modules attachable in a concentric arrangement around the outer circumference of the submerged portion of the riser, wherein each of the buoyancy modules defines a second longitudinal axis that is spaced from and generally parallel to the first longitudinal axis of the submerged portion of the riser to which the module is attached, and wherein the buoyancy modules are composite buoyancy modules comprising a material selected from the group consisting of one or more of glass fiber/polymeric resin, carbon fiber/polymeric resin, hybrid glass/carbon fiber polymeric resin, rubber reinforced with nylon fibers, and rubber reinforced with steel fibers, wherein at least some of the buoyancy modules are disposed in a vertically-stacked arrangement along a common vertical axis, and wherein the ends of adjacent pairs of modules in the stacked arrangement are connected together by load-transferring skirts conforming to the shapes of the ends of the modules.

7. The buoyancy system of claim 6, further comprising a thrust plate assembly connected to said riser at a joint for transferring buoyancy forces from said composite buoyancy modules to said riser.

8. The buoyancy system of claim 6, further comprising a stopper assembly connected to said riser so as to prevent said composite buoyancy modules from shifting axially down said riser.

* * * * *